Oct. 15, 1963    B. B. MATHIAS ETAL    3,107,011
INSPECTING RIMS OF CONTAINERS
Filed Dec. 23, 1960    9 Sheets-Sheet 1
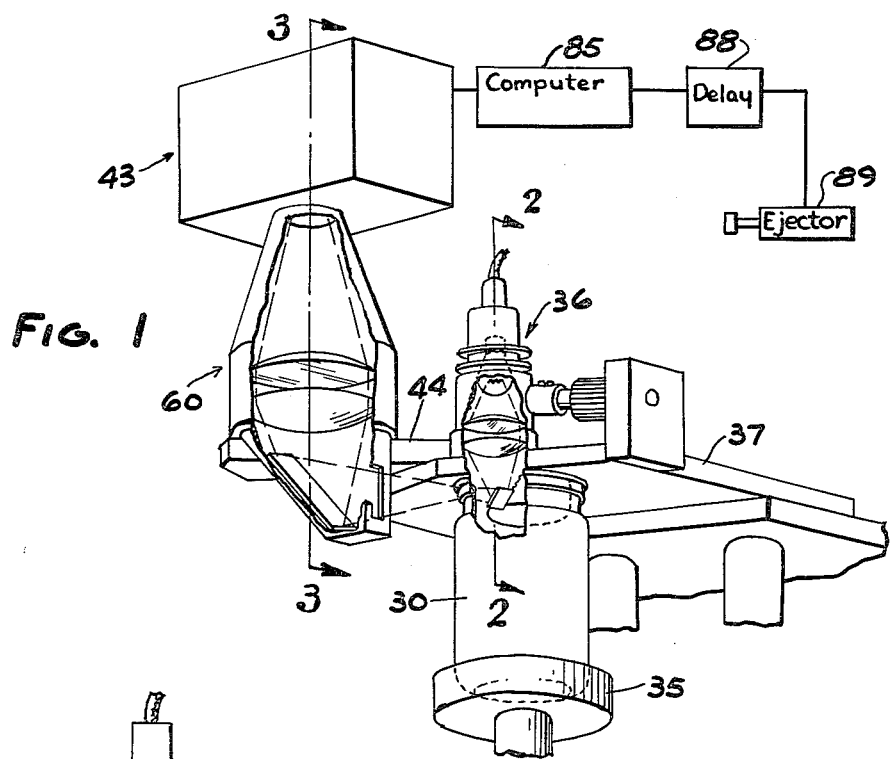
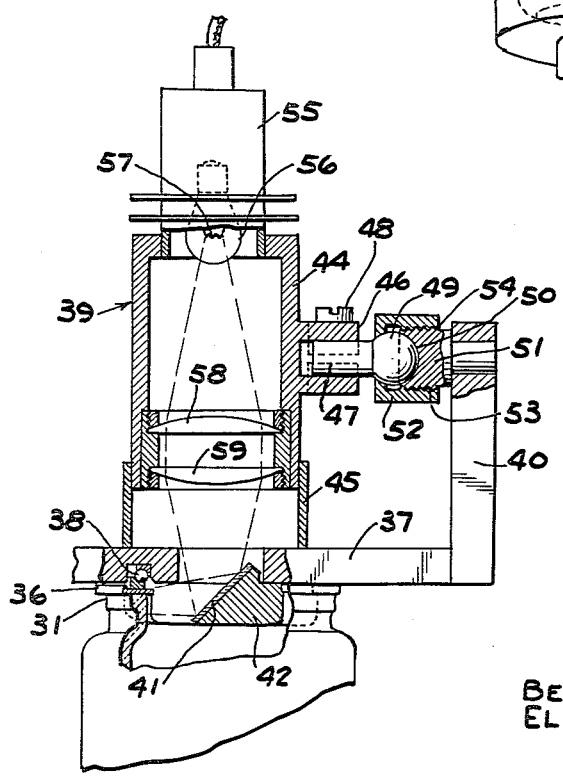
INVENTORS
BENNY B. MATHIAS &
ELLSWORTH M. MURLEY JR.
BY W.A. Schaich &
Charles S. Lynch
ATTORNEYS

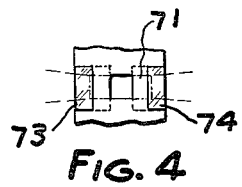
FIG. 4
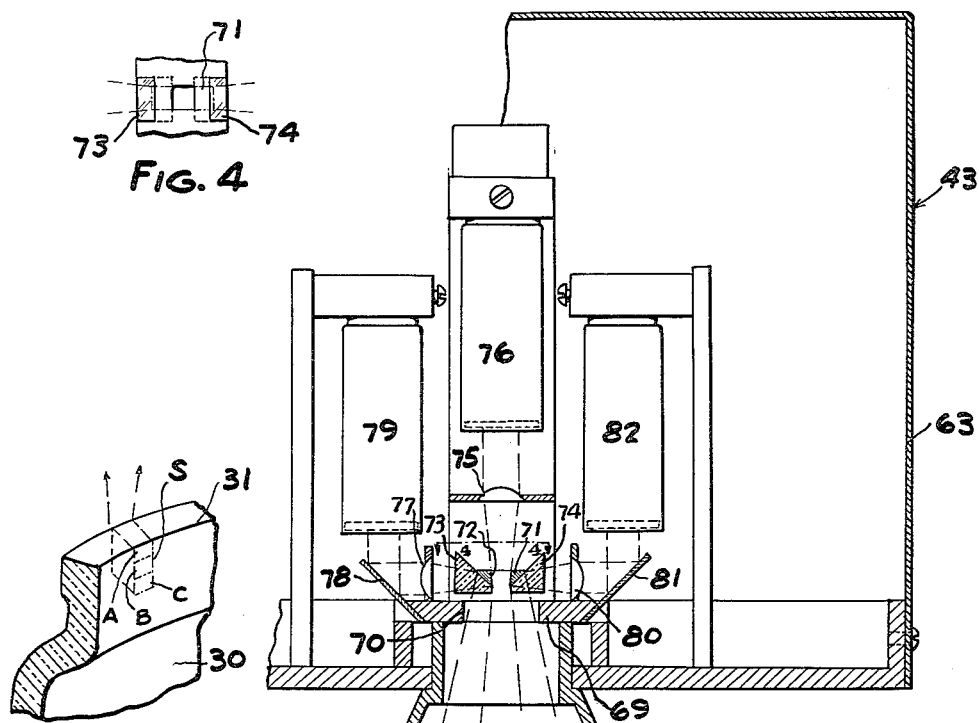
FIG. 3
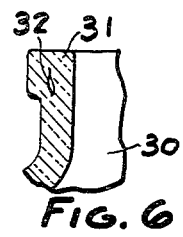
FIG. 5
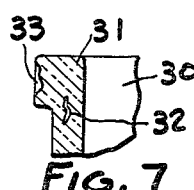
FIG. 6
FIG. 7
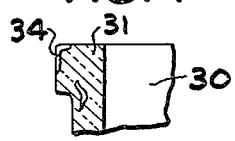
FIG. 8
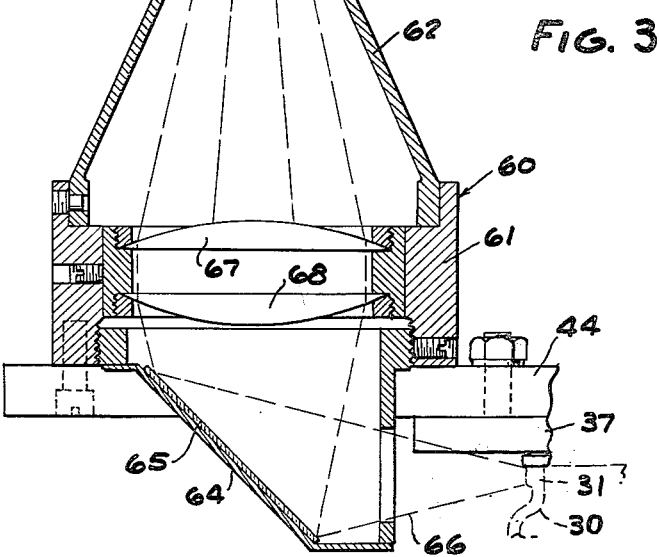
INVENTORS
BENNY B. MATHIAS &
ELLSWORTH M. MURLEY JR.
BY
W.A. Schaich &
Charles S. Lynch
ATTORNEYS

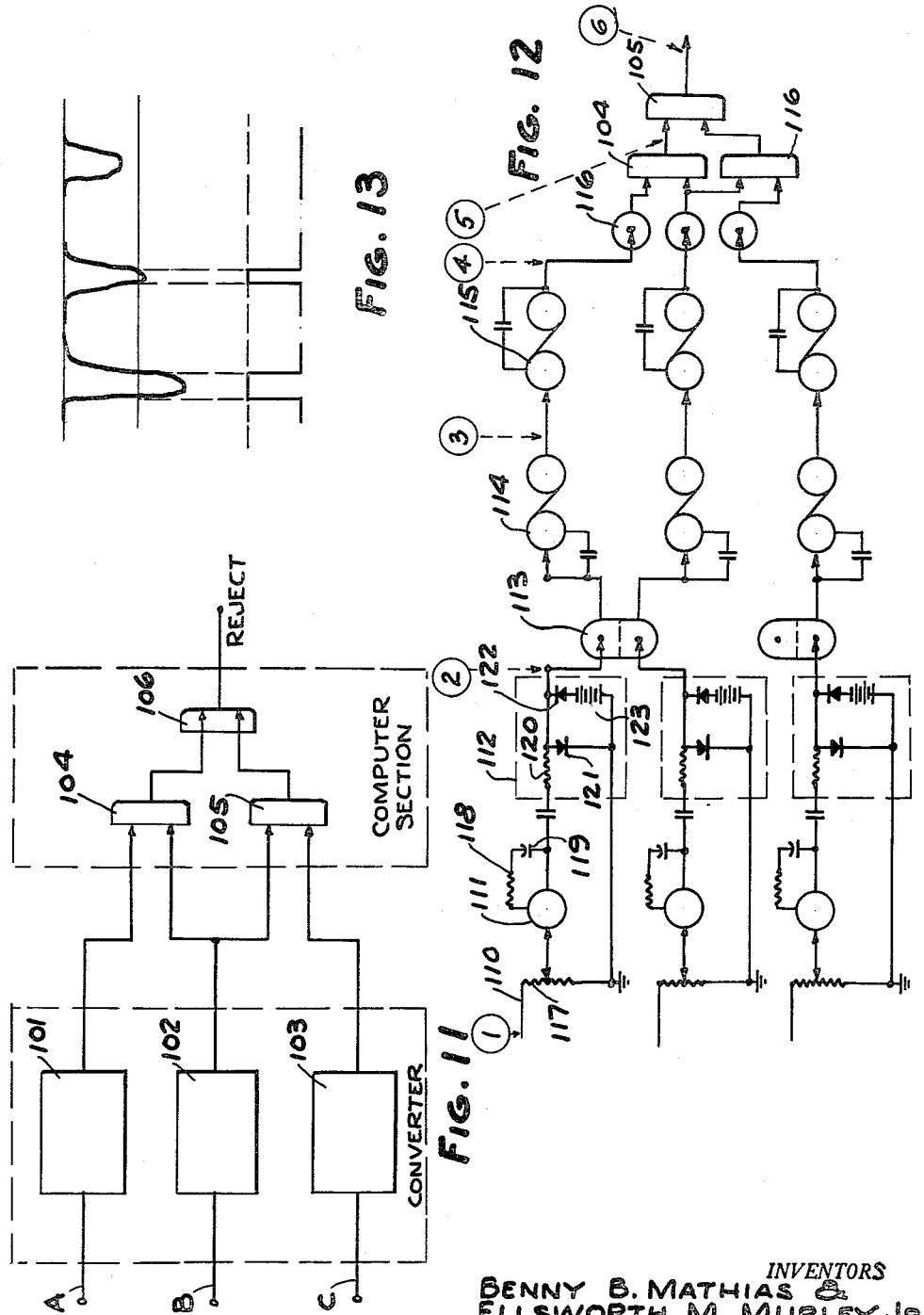

Oct. 15, 1963 B. B. MATHIAS ETAL 3,107,011
INSPECTING RIMS OF CONTAINERS
Filed Dec. 23, 1960 9 Sheets-Sheet 7
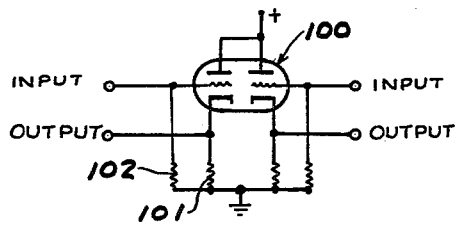
FIG. 18
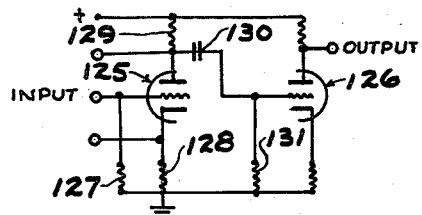
FIG. 19
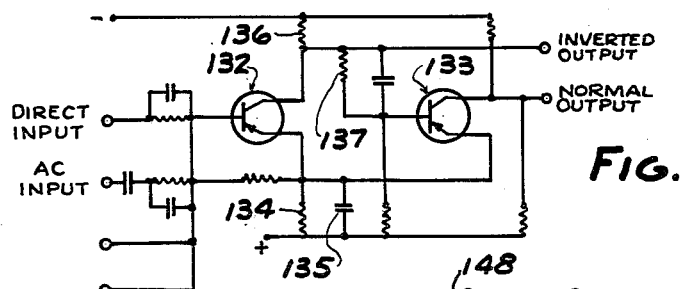
FIG. 20
FIG. 21
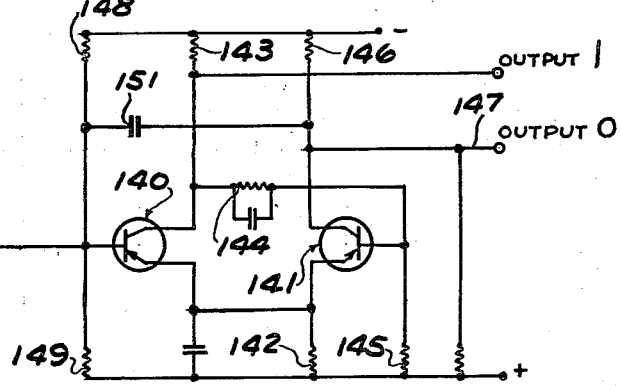
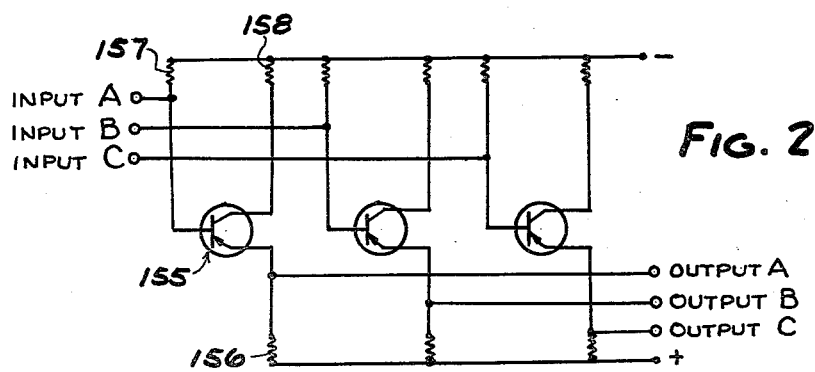
FIG. 22
INVENTORS
BENNY B. MATHIAS &
ELLSWORTH M. MURLEY JR.
BY W. A. Schaich &
Charles S. Lynch
ATTORNEYS

United States Patent Office 3,107,011
Patented Oct. 15, 1963

3,107,011
INSPECTING RIMS OF CONTAINERS
Benny B. Mathias and Ellsworth M. Murley, Jr., Toledo, Ohio, assignors to Owens-Illinois Glass Company, a corporation of Ohio
Filed Dec. 23, 1960, Ser. No. 78,062
27 Claims. (Cl. 209—111.5)

This invention relates to inspecting containers made of translucent material and particularly to a method and apparatus for inspecting the rims of open mouth glass containers in order to detect flaws therein commonly known as line-over-finish defects.

In the manufacture of containers of glass or similar materials, one type of defect which is commonly encountered is known as a line-over-finish defect. Specifically, when a gob or parison of glass is pressed or blown to form an open mouth container, small blisters in the glass tend to become distorted and elongated. When such elongated blisters are present in the rim of an open mouth container, commonly known as the finish, they extend generally axially of the container in the form of generally cylindrical voids either in the rim wall or on the surface of the rim wall. In some instances, the voids extend generally radially over the upper edge of the rim wall. When present on the sealing surface, such a defect tends to prevent a proper seal when a closure having a gasket or sealing material therein is applied to the container. Where the defect is on the surface of the rim, air may enter between the gasket material and the surface. Where the defect is below the surface, the defect may in due time open up and extend to the surface thus forming a point of possible leakage of air past the gasket of the container. Obviously, a close inspection of the rims is essential in order that such containers can be detected and discarded.

In my copending application Serial No. 816,765, titled Inspecting Rims of Open-Mouth Containers, filed May 29, 1959, of which this application is a continuation-in-part, there is disclosed a method and apparatus for inspecting rims for line-over-finish defects wherein a beam of radiant energy to which the glass is transparent is directed against the rim of the container at an acute angle to a radial plane and is focused as a spot on the rim. The container is then rotated about its axis relative to the spot in order to cause the spot to successively scan portions of the rim. A light sensitive element such as a photocell is positioned with its line of vision forming an angle of 125 to 175 degrees with the direction of the beam toward the rim. When a line-over-finish defect is present, a portion of the beam is both refracted and reflected by the defect. The directed portion is focused to form an image of the defect that is sensed by the light sensitive element. The signal created by the light sensitive element is amplified and cause to actuate a rejection mechanism.

Although the above described method and apparatus quickly and efficiently detects containers having line-over-finish defects, it is subject to the limitation that in some instances containers are rejected which have blisters that are not elongated sufficiently as to be undesirable. When a defect is present, a reject signal is produced even though the defect is not elongated to an extent such that it would be undesirable.

It is therefore an object of this invention to provide a method and apparatus for quickly and easily inspecting the rims of open mouth containers for undesirable line-over-finish defects but passing containers having permissible line-over-finish defects in the rim thereof.

Basically, the invention comprises creating an image of the defect in the manner described in the aforementioned copending application and thereafter determining whether or not the image has a sufficient elongation in the direction which would result in its being considered an undesirable line-over-finish defect. This is accomplished by dissecting or dividing the area of the rim of the container which is being viewed into a plurality of zones, preferably three, and rejecting the container only if an image of the defect is received simultaneously from two adjacent zones of the three zones of the area being viewed. If a signal is received from only one of the zones being viewed or from two non-adjacent zones, then the container is passed.

In the drawings:

FIG. 1 is a part sectional, partly diagrammatic perspective view of an apparatus embodying the invention.

FIG. 2 is a fragmentary sectional view taken substantially along the line 2—2 in FIG. 1.

FIG. 3 is a sectional view taken along the line 3—3 in FIG. 1.

FIG. 4 is a sectional view taken along the line 4—4 in FIG. 3.

FIG. 5 is a fragmentary perspective view of a rim of a container which is being inspected.

FIGS. 6 7, and 8 are fragmentary vertical sections through the rim of glass containers showing various types of line-over-finish defects.

Figure 9:
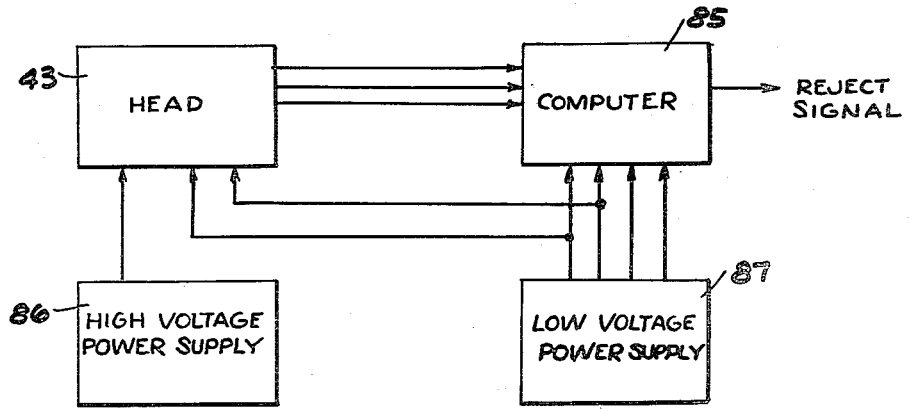

FIG. 9 is a block diagram of the inspecting apparatus.

Figure 10:
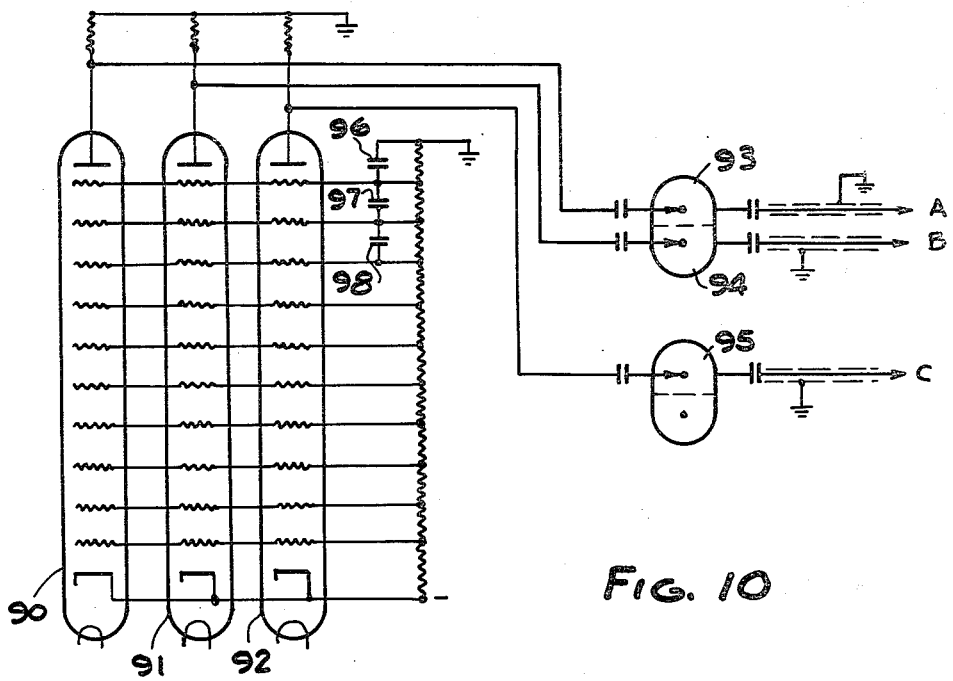

FIG. 10 is a schematic wiring diagram of the inspecting head of the apparatus.

FIG. 11 is a block diagram of the computer of the inspecting apparatus.

FIG. 12 is a schematic wiring diagram of the computer apparatus.

FIG. 13 is a wave diagram showing the function of the converter portion of the computer.

Figure 14:
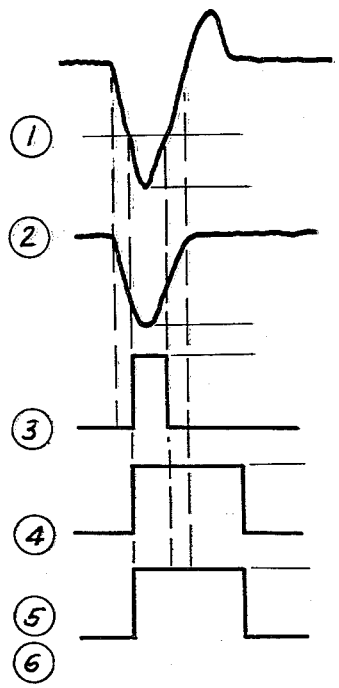

FIG. 14 is a wave diagram showing the function of the computer.

Figure 15:
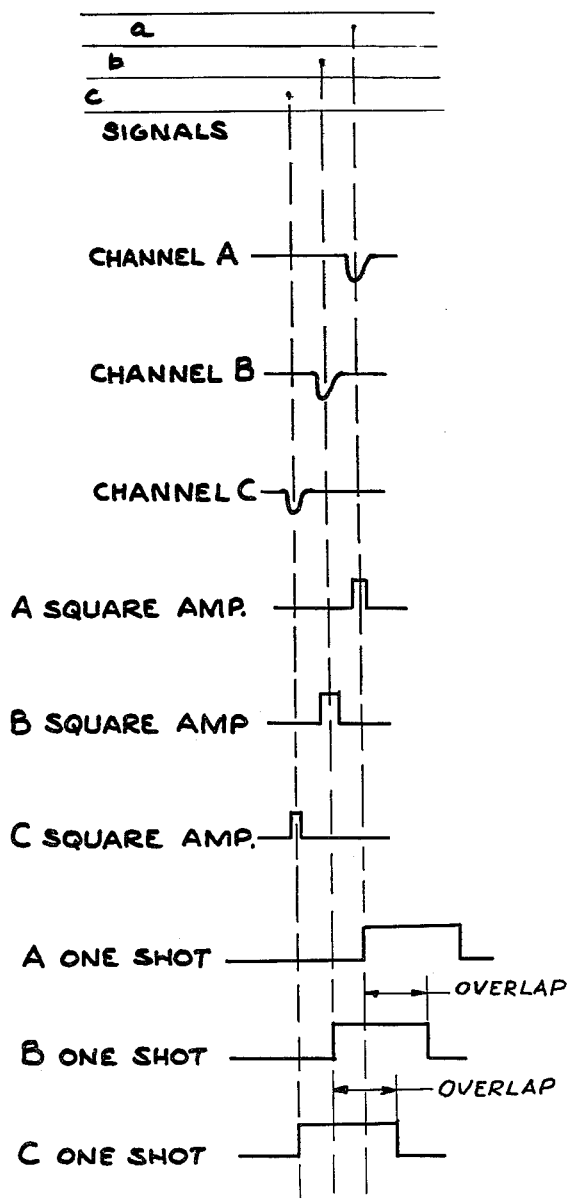

FIG. 15 is a wave diagram showing the function of the computer in detecting line-over-finish defects that are inclined to the axis of the container.

Figure 16:
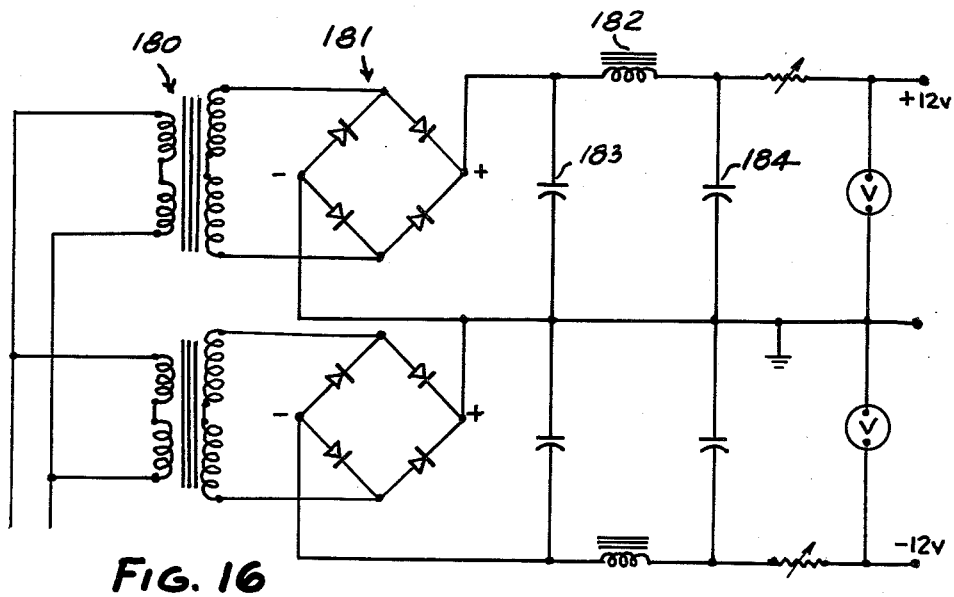

FIG. 16 is a schematic wiring diagram of a part of the low voltage power supply.

Figure 17:
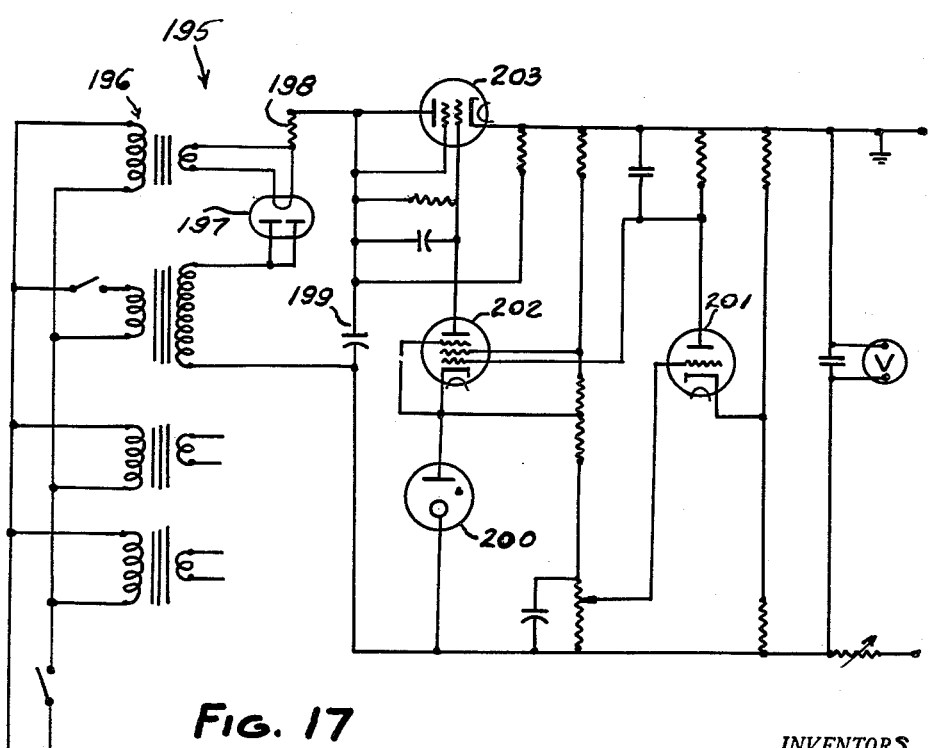

FIG. 17 is a schematic wiring diagram of the high voltage power supply.

FIG. 18 is a schematic wiring diagram of a cathode follower used in the electronic apparatus.

FIG. 19 is a schematic wiring diagram of a linear amplifier used in the apparatus.

FIG. 20 is a schematic wiring diagram of a squaring amplifier used in the apparatus.

FIG. 21 is a schematic wiring diagram of a one-shot used in the apparatus.

FIG. 22 is a schematic wiring diagram of an emitter follower used in the apparatus.

Figure 23:
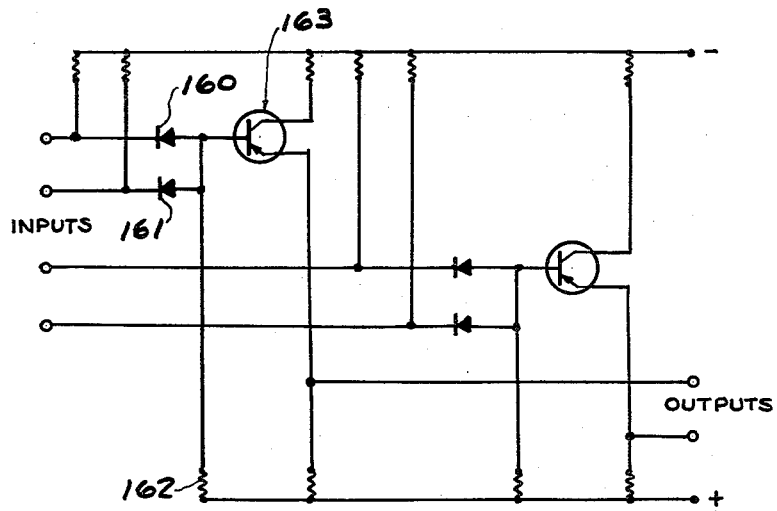

FIG. 23 is a schematic wiring diagram of an "and" gate used in the apparatus.

Figure 24:
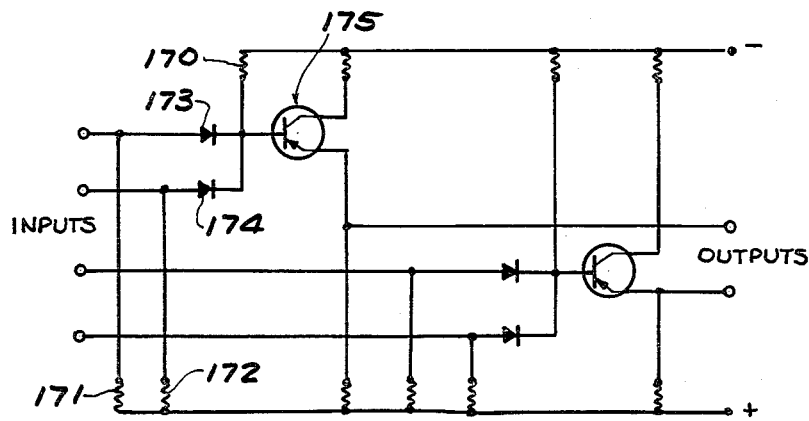

FIG. 24 is a schematic wiring diagram of an "or" gate used in the apparatus.

Figure 25:
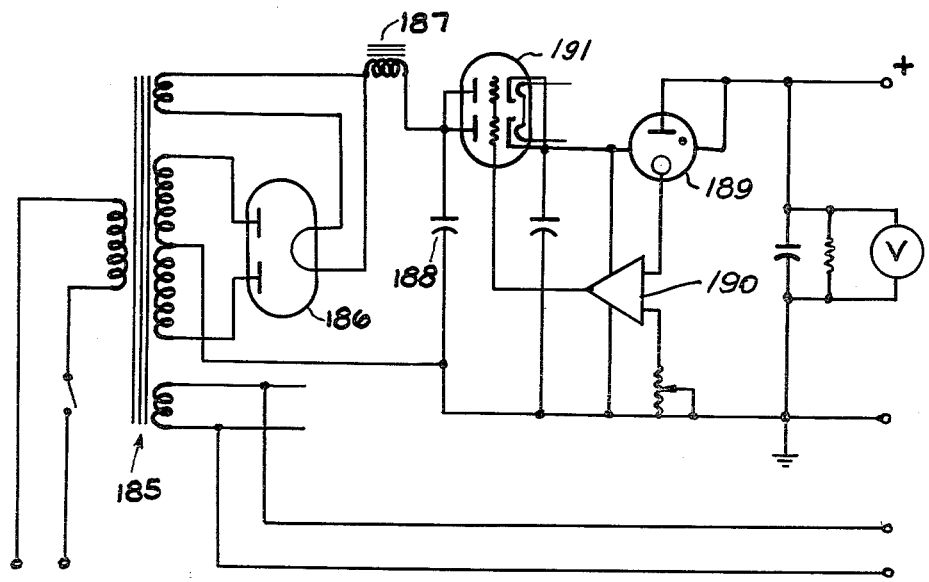

FIG. 25 is a schematic wiring diagram of another part of the low voltage supply.

Figure 26:
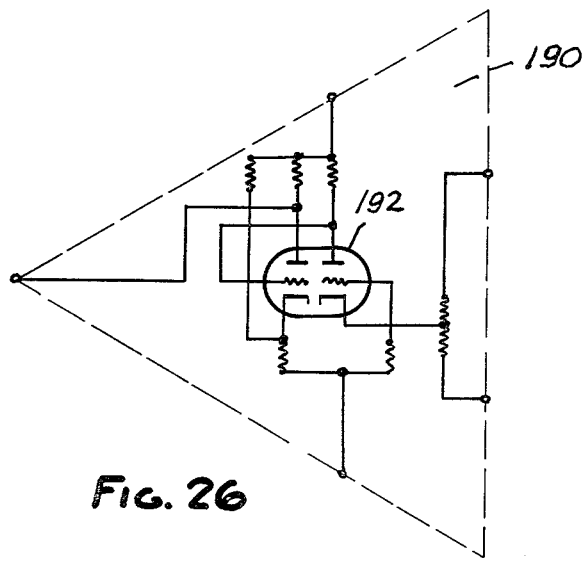

FIG. 26 is a wiring diagram of a portion of the circuit shown in FIG. 25.

Referring to FIGS. 1 and 2, a container 30 which is to be inspected is formed with a rim 31 commonly known as a finish, which defines an open mouth or upper end. The types of defects, known as line-over-finish defects, which are to be detected are shown on an exaggerated scale in FIGS. 6, 7 and 8. In FIG. 6, the defect lies wholly within the body of the rim 31 and is in the form of a generally cylindrical void 32 formed by a blister which has been elongated in a direction generally parallel to the axis of the container during the formation of the container, for example, by blowing or pressing. In FIG. 7, the defect 33 is formed in a similar manner and is on the outer surface of the rim of the container. In FIG. 8, the defect 34 is on the outer surface of the rim and extends over the upper edge of the rim.

Referring to FIG. 1, the apparatus embodying the invention comprises a vertically reciprocable support pad 35 which is adapted to be rotated about its axis and onto which containers 30 are moved in succession by a suitable apparatus, for example, such as shown in the patent to Fedorchak et al. 2,682,802.

When support pad 35 is moved upwardly, the rim 31 of container 30 is brought into contact with a head 36 which is rotatably mounted in a table 37 by ball bearings 38 (FIG. 2). A source 39 of radiant energy, such as incandescent light, is mounted on an upright plate 40 on table 37 and is adapted to direct a beam of light against a mirror 41 mounted on a mirror housing 42 and to focus the beam of light in a spot S (FIG. 5) on the interior of the rim 31 of the container 30.

Referring to FIG. 1, a head 43 mounted on plate 44, which in turn is mounted on table 37 adjacent the exterior of the container 30, is adapted to receive light refracted and reflected from a line-over-finish defect on the container and focus the light in an image adjacent light sensitive devices, as presently described.

Specifically, as shown in FIG. 2, source 39 comprises a generally cylindrical housing 44 which is telescopically received in a tub 45, fixed on plate 37, by a structure which includes a laterally extending tubular projection 46 in which a shaft 47 is fixed by a clamping screw 48. The outer end of shaft 47 is in the form of a sphere 49 which engages a spherical surface 50 in a plug 51 mounted in upright plate 40. A collar 52 engages the sphere 49 and is formed with threads that engage complementary threads 54 on plug 36 to frictionally hold the shaft 49 and, in turn, the housing 44 in adjusted position on upright plate 40. A lamp support 55 including an incandescent lamp 56 is mounted on the upper end of housing 30. The lamp 56 has an elongated generally rectangular filament 57. Condensing lenses 58, 59 in the path of the light from the lamp 41 condense the light beam and direct the light beam downwardly onto the surface of a flat mirror 41 which is positioned with its plane forming an angle of 45 degrees with a vertical axis. Mirror 41 is preferably of the type having the mirror surface on the exterior. The beam is reflected by mirror 41 longitudinally against the inner surface of the rim 31 of the container at an acute angle to a radial plane of the container and is focused in a spot S on the rim 31.

As shown in FIG. 3, head 43 comprises a housing 60 having a lower cylindrical section 61, an upper inverted frusto-conical section 62 and a box section 63. Lower cylindrical section 45 supports a removable mirror housing 64 in which a flat mirror 65 is positioned with its plane forming an angle of 45 degrees with a vertical axis. Mirror 65 is of the type having the mirror surface on the exterior. Mirror housing 64 includes an opening 66 in a vertical wall thereof through which the light refracted and reflected from a line-over-finish defect on the container 30 is directed horizontally toward the mirror 65. The relation of mirrors 65 and 41 is such that line of vision of the mirror 65 forms an angle of 125 to 175 degrees with the direction of the beam toward rim 31. A pair of condensing lenses 67, 68 are supported in housing section 61 with their axes coincident with the axis of a rectangular aperture 70 in aperture plate 69. The condensing lenses 67, 68 are adapted to focus the image of the defect onto the plane of the aperture 70 in the aperture plate 69. The aperture 70 in the aperture plate 69 limits the area of vision of the portion of the rim being inspected. This improves the ratio of the amount of light scattered and directed to the light sensitive devices from a finish without a line-over-finish defect relative to the amount of light refracted and reflected to the light sensitive devices from a line-over-finish defect.

As heretofore mentioned, the incandescent lamp 56 preferably has a straight horizontal filament 57 which produces a generally rectangular beam of light. The rotational position of the lamp 41 is adjusted so that the rectangular spot S has its longest dimension extending generally parallel to the axis of the container, as shown in FIG. 5. Rectangular aperture 70 is oriented so that the portion of light being viewed by the light sensitive devices corresponds to the portion of the rim which is illuminated by the spot S.

The upper box section 63 of the head 43 includes means for dividing the image focused in the plane of the aperture plate 69 into a plurality of areas or zones that are individually viewed by light sensitive devices to determine the presence or absence of defects in those zones. If defects are simultaneously noted in two adjacent zones, the container is rejected, as presently described.

As shown in FIG. 3, the division of the image into a plurality of zones, herein shown as three, is achieved by the use of a second aperture plate 71 having an aperture 72 that views or covers the central portion of the aperture 70, and a pair of prisms 73, 74 that are so positioned as to overlie the ends of the aperture 70. The portion of the image viewed by the aperture 72 passes upwardly through collecting lens 75 to a light sensitive device 76 such as a photo-multiplier tube. The portion of the image intercepted by the prism 73 is reflected horizontally to collecting lens 77 which directs the light to a mirror 78 that reflects the light upwardly to a light sensitive device 79 such as a photo-multiplier tube. Similarly, the portion of the image intercepted by the prism 74 is reflected horizontally to collecting lens 80 which directs the light to a mirror 81 that reflects the light upwardly to a light sensitive device 82 such as photo-multiplier tube. By this arrangement, presence of a defect in any three zones A, B C of spot S is detected (FIG. 5).

FIG. 9 shows a block diagram of the electronic appartus for analyzing the signals produced by portions of the image of the defect. The head 43 is adapted to send as many as three signals from the photo-multiplier tubes to a computer 85. High voltage power is supplied to the head 43 from a high voltage power supply 86 while low voltage is supplied to the head 43 and computer 85 from a low voltage power supply 87. Computer 85 is adapted to analyze the signals received from the head 43 and produce a reject signal in the event that the container contains a defect which would require rejection. The reject signal actuates a time delay 88 that, in turn, energizes an ejector 89 after the container has been removed from the pad 35 thereby rejecting the container (FIG. 1).

The problem which the computer 85 must solve is that of determining when signals are present in two adjacent zones of the portion of the rim which is being inspected. If the channel or if the zones are identified as A, B and C and "1" is used to indicate a defect and "0" is used to indicate no defect, then are are eight possible combinations which may occur at any given time in accordance with the following table:

| Case | Zone A | Zone B | Zone C | Reject |
|---|---|---|---|---|
| 1 | 0 | 0 | 0 | 0 |
| 2 | 0 | 0 | 1 | 0 |
| 3 | 0 | 1 | 0 | 0 |
| 4 | 1 | 0 | 0 | 0 |
| 5 | 1 | 0 | 1 | 0 |
| 6 | 1 | 1 | 0 | 1 |
| 7 | 0 | 1 | 1 | 1 |
| 8 | 1 | 1 | 1 | 1 |

In case 1, no defect is in any zone, indicating a good finish and therefore no reject pulse is desired. Cases 2 through 4 show a defect in only one zone. This would indicate a seed or similar defect was present in the finish instead of a line so that a reject pulse is not needed. A reject pulse is not desired in this case. Case 5 shows simultaneous defects in non-adjacent zones. Two seeds can cause such a defect or a line that does not extend into the sealing surface. A reject pulse is not desired for this case. Cases 6 and 7 show defects in two adjacent zones which indicates the presence of a line-over-finish defect. Case 8 shows a defect in all three zones. In the last three cases, a reject pulse is desired.

From the above chart the computer logic can be derived. A reject pulse is desired if a defect occurs simultaneously in zones A and B, in zones B and C, or in zones A, B and C. This gives the Boolean equation:

$$D = (A \cdot B) \vee (B \cdot C) \vee (A \cdot B \cdot C) \tag{1}$$

where:

$D$ = reject pulse
$A, B, C$ = zone defects
$\cdot$ = "and" function
$V$ = "or" function Note, however, that if a defect occurs in zones A, B and C, it represents a special case of both of the first two "and" functions. Equation 1 can therefore be reduced to:

$$D = (A \cdot B) \vee (B \cdot C) \tag{2}$$

Equation 2 is the equation the computer must solve and indicates the logic components that are needed to construct such a computer.

Head

The schematic wiring diagram for the head 43 is shown in FIG. 10. The head comprises three photo-multiplier tubes 90, 91, 92 corresponding to the light sensitive devices 79, 76 and 82 in FIG. 3; a voltage divider network; and three cathode followers 93, 94 and 95.

The light refracted and reflected from a defect is focused on the transparent cathodes of the photo-multiplier tubes, which may be of the type commonly known as 6199. One photo-multiplier tube is provided for each zone of the rim which is being inspected. As shown in FIG. 10, the top three resistors of the photo-multiplier tubes are bypassed by capacitors 96, 97, 98. This combined with the well regulated high voltage supply eliminates cross modulation of the photo-multiplier outputs which might occur due to a common voltage divider. The use of a single voltage divider substantially reduces the space required in the head 43. The output of each photo-multiplier is directed to one of the cathode followers 93, 94, 95. The cathode followers are used as impedance transformers to match the high impedance of the photo-multiplier circuit to the low impedance of the cable.

Each cathode follower is of a conventional type such as shown in FIG. 18 and comprises one-half of a dual cathode follower 100. When a high voltage is applied to the plate of the cathode follower 100, current flows through the cathode follower and establishes a quiescent voltage drop across cathode resistor 101. The grid is clamped at ground through resistor 102. The voltage drop across resistor 101 then establishes cathode bias for the tube.

When a positive going signal is applied to the grid, more current flows through the tube, hence, more voltage drop occurs across cathode resistor 101. The reverse happens on a negative going signal. The output signal across the cathode resistor 102 follows the input signal.

Computer

The block diagram of the computer is shown in FIG. 11. The signals from the photo-multiplier tubes 90, 91, 92 in the head enter the computer along lines A, B and C. As shown in FIG. 11, the computer comprises a converter individual to each line which converts the signals from the head to binary digits, as shown in FIG. 13. One converter is provided for each zone of the rim of the container which is being inspected. The computer also includes a computer section which solves the previously discussed Boolean equation.

Converter

The schematic wiring diagram of the computer is shown in FIG. 12. In this figure, the converter for each zone is shown as comprising an attenuator 110, a linear amplifier 111, a clipping and clamping circuit 112, a cathode follower 113, a squaring amplifier 114, a one-shot 115, and an emitter follower 116.

The incoming electrical signal from one of the photo-multiplier tubes is fed to a potentiometer 117 that forms part of the attenuator 110 that controls the amplitude of the incoming pulse. The linear amplifier 111 receives the signal, the feedback loop consisting of a resistor 118 and capacitor 119 limiting the amplifier gain and give an essentially flat frequency response. The amplifier output is fed to the clipping and clamping circuit 112 which consists of a resistor 120, crystal diodes 121, 122 and a battery 123. One diode clips all positive going signals and clamps reference level to ground potential while the other diode, with the battery in its anode circuit, clips any negative going signal to a predetermined maximum. This circuit protects the transistors from accidental damage.

The signal goes then through a cathode follower 113, which can be of the type previously described in connection with the head 43. This circuit matches the impedance of the transistor circuits. The signal is then fed to a squaring amplifier 114 comprising a transistorized Schmitt trigger. The squaring amplifier 114 converts the negative input pulses of varying amplitudes to a standard digit which, in turn, is fed to the one-shot 115. The one-shot 115 widens the pulses from the squaring amplifier. The change in wave form of the pulses as it travels through the converter is shown in the wave diagrams in FIG. 14 wherein the wave forms are designated by circled numbers corresponding to the circled points on FIG. 12. The widening of the pulse by one shots 115 is necessary to prevent some line-over-finish defects from being passed. For example, as shown in FIG. 15, if the line-over-finish defect is inclined to the axis of the container, shown at an exaggerated inclination in FIG. 15, the signals A, B, C produced by the inclined line-over-finish defect might be insufficient to produce signals which would overlap. Thus, the digital signals of the squaring amplifier are widened by the one-shot so that they overlap as shown in FIG. 15.

The linear amplifier 11 can be of the type shown in FIG. 19 and comprises a two stage R-C coupled class "A" audio voltage amplifier. As shown in FIG. 19, the amplifier comprises two halves 125, 126 of a dual triode tube. Resistor 127 extending to ground forms the input load. Resistor 128 in the cathode circuit provides direct current bias and alternating current feedback. Resistor 129 comprises the plate load resistor. An input signal varies the current through the first stage 125, hence, the voltage drop across the plate load resistor 129. The variation across resistor 129 is the same as the input signal except the voltage gain takes place and a 180 degree phase reversal takes place. The signal across the plate load resistor 129 is coupled to the input of the second stage 126 by the capacitor 130 and the resistor 131. Further amplification takes place in the second stage 126 which works in an identical manner to the first stage 125.

Squaring amplifier 114 can be of the type shown in FIG. 20. The squaring amplifier converts the negative impulses of variable amplitude to standard digits that shift from a negative to a less negative voltage with each input pulse. As shown in FIG. 20, the squaring amplifier comprises two transistors 132, 133. Transistor 132 is cut off and transistor 133 is saturated. The transistor 132 is assured to be in the cut off position because the two transistors are emitter coupled by the resistor 134 and capacitor 135. The current flowing through the second transistor 133 causes a voltage drop through resistor 134 which makes the emitter of the first transistor 132 negative with respect to its base. Thus, the transistor 132 is reversed biased. The second transistor 133 is forward biased from the collector load resistor 136 of the transistor 132 and the resistor 137 connecting the load resistor in the base of the second transistor 133. In its quiescent state, the first transistor 132 is cut off and the second transistor 133 is saturated. The small amount of cut-off current in the first transistor 132 causes a slight voltage drop across its collector load 136 clamping the output at a negative voltage.

When a negative pulse is applied at the point called A.C. input, the first transistor 132 becomes forward biased and begins to conduct. At the same time, the voltage drop across its load resistor 136 is reduced. This regenerative action continues until the first transistor 132 is saturated and the second transistor 133 is cut off. When this happens, the point titled inverted output is at a lesser voltage than before. When the input pulse at A.C. input is removed, the reversed bias is again applied to the first transitsor and the circuit will restore itself to its original condition.

One-shot 115 can be of the type shown in FIG. 21 and comprises a monostable vibrator whose purpose is to receive a pulse and convert it to a pulse of standard amplitude and standard width. As shown in FIG. 21, the one-shot comprises transistors 140, 141, Initially, transistor 140 is conducting and transistor 141 is cut off. The cut off of transistor 141 is provided by a voltage drop across resistor 142 and the voltage drop across the combined resistances 143, 144, 145. This causes a reversed bias on transistor 141, cutting it off. The cut-off current through resistor 146 clamps the output 147 to a predetermined voltage. Transistor 140 is held in saturation by a voltage divider 148, 149 which forward biased transistor 140.

When a positive pulse is fed to input 150, transistor 140 conducts less. As a result, the drop across resistor 143 decreases and the transistor 141 becomes forward biased and begins to conduct. This action continues until transistor 140 is cut off and transistor 141 is conducting. This raises the voltage at 147 to a less negative voltage. At the same time, transistor 140 is held at a cut off by capacitor 151 which has been charged. A capacitor charge holds transistor 140 at cut off. Capacitor 151 discharges exponentially through resistor 148. As soon as the reversed bias is removed from transistor 140 by the discharge of capacitor 151, transistor 140 will begin to conduct thus cutting off transistor 141 and restoring the circuit to its original condition. The output pulse is controlled by the time constant of resistance 148 and capacitor 151.

Emitter follower 116 can be of the type shown in FIG. 22. The emitter follower comprises three electrically isolated emitter followers which are roughly the transistor equivalent of a cathode follower. The output from each one-shot 115 is directed to one of the emitter followers. Each emitter follower comprises a transistor 155, the base of which is clamped to a predetermined negative voltage. When the input corresponds to this voltage, the drop across the resistor 156 corresponds to the same voltage. When the input is at a lesser negative voltage, the transistor conducts less and the output rises to the corresponding lesser voltage. The resistance 157 provides bias to the transistor 155. The resistance 158 helps establish the direct current level in the output which is at a lower impedance than the input.

*Computer Section*

The computer section, as previously described, consists of two "and" gates 104, 105 and an "or" gate 106. Each "and" gate has two inputs and one output. If either or both inputs are "0" the output is "0." If both inputs are "1" the output is "1." The "and" logic can be seen from the following equation:

$$C = A \cdot B$$

An "or" gate will give a "1" output if any input is "1." Hence:

$$C = A \vee B$$

By hooking the two "and" gates and the "or" gate as shown in FIGS. 11 and 12:

$$D = (A \cdot B) \vee (B \cdot C)$$

One obtains the required logic function of Equation 2. A defect occurring on zones A and B simultaneously will cause the upper "and" gate to fire and reject through the "or" gate. The same function will occur with the lower "and" gate with defects on B and C zones. If a defect occurs in all three zones both "and" gates will fire. The above arrangement of the gates solves the equation:

$$D = (A \cdot B) \vee (B \cdot C)$$

The reject pulses from the "or" gate are positive-going pulses. A triode amplifier is used to amplify and invert the pulse. This is fed to the reject mechanism.

The dual "and" gate performing the function of "and" gates 104, 105 can be the type shown in FIG. 23. The dual "and" gate comprises a pair of diode resistor circuits and emitter followers. As shown in FIG. 23, both diodes 160, 161 are forward biased by the supply voltage and resistor chain. Current will flow through the diodes clamping the voltage across the resistor 162 at a given level. If a positive voltage appears on either input that diode will be reverse biased and will not conduct. However, the other diode will continue to conduct and the voltage across the resistor 162 will remain clamped at its original value. If both inputs receive a positive pulse simultaneously, both diodes 160, 161 will be reverse biased and the voltage drop across resistor 162 will rise producing an output pulse. The output pulse will be fed to an emitter follower 163 which operates in the same manner as the emitter followers described in FIG. 22. The second half of the dual "and" gate operates in the same fashion as the first half.

Dual "or" gate can be of the type shown in FIG. 24 and comprises two input "or" gates. As is well known, an "or" gate is a circuit which produces an output pulse if a pulse is present on any input. The voltage divider chain provided by the resistors 170, 171 reverse biases the diodes 173, 174 as the anode of the diodes are at a predetermined negative voltage with respect to the "and" gate. If either input receives a positive pulse, the corresponding diode will conduct and increase the base current of the emitter follower 175 which produces an output pulse. Emitter follower 175 operates in identical fashion to that described in FIG. 22. The second half of "or" gate operates in the same fashion as the first half.

*Power Supply*

Low and high voltage power is required for the circuitry heretofore mentioned. The power supply can be obtained by various devices. As shown in FIG. 16, a part of the low voltage power supply provides low voltage outputs for the transistor circuits. The low voltage supply in FIG. 16 comprises a full-wave bridge rectifier which includes a transformer 180 and a full-wave bridge 181. The circuit shown in FIG. 16 further includes a filter section which smooths out the pulsating D.C. from the rectifier. The filter section comprises a coil 182 and capacitors 183, 184. This type of a filter section is known as a Pi section. In the circuit shown in FIG. 16, a duplicate power supply is provided.

A typical circuit for providing a slightly higher voltage for the vacuum tube circuits is shown in FIG. 25. This circuit includes a rectifier section which is a conventional full-wave rectifier and consists of a step-up transformer 185 and a 5U4 rectifier tube 186 which converts the stepped up voltage to pulsating D.C. The circuit also includes a filter section formed by a coil 187 and capacitor 188. This type of filter is commonly known as a L-section and removes the ripple from the pulsating D.C. The circuit shown in FIG. 25 also includes a voltage regulator comprising the right-hand portion of the circuit and including a glow tube 189 across which a constant voltage is maintained, an amplifier 190 and a passing tube 191, herein as shown as a 6AS7. The operation of such a voltage regulator is well known. When a sudden voltage increase is produced in the line, more current flows through amplifier 190 increasing the bias of passing tube 191 thereby increasing the resistance of tube 191 and dropping the output voltage. When the voltage across the load tends to drop, the resistance of passing tube 191 is decreased bringing the voltage across the load to its normal value. Amplifier 190 comprises a D.C. amplifier, a typical wiring diagram which is shown in FIG. 26. Amplifier 190 includes a 12AY7 tube 192. D.C. amplifiers of this type has been manufactured by Engineered Electronics Company, Santa Ana, California, under the designation Z-90016.

The wiring diagram for the high voltage power supply is shown in FIG. 17 and comprises a high voltage rectifier 195 consisting of a transformer 196 half wave rectifier tube 197. The high voltage supply shown in FIG. 17 also includes a L-section filter including a resistor 198 and condenser 199. The circuit also includes a voltage regulator comprising a glow tube 200 across which a constant voltage is maintained, an amplifier tube 201 and a passing circuit consisting of tubes 202, 203. Glow tube can be of the type commonly known as a VR-150 tube; amplifier tube can be of the type commonly known as a 6SF5 tube; tube 202 can be of the type commonly known as a 6AC7 tube; and tube 203 can be of the type known as a 6L6 tube. The operation of a regulator circuit such as shown is well known. When the voltage across the load tends to increase, the voltage on the grid of tube 201 increases causing more current to flow through tubes 202, 203 thus increasing the resistance caused by these tubes and dropping the output voltage. When the voltage across the load drops, the resistance of tubes 202, 203 decreases thereby bringing the voltage across the load to its normal value.

These power supply circuits are only typical of others that can be used.

*Operation*

When containers 30 are to be inspected, they are brought successively to the pad 35 and the pad 35 is elevated bringing the rim 31 of the container into engagement with the head 36. The pad 35 is then rotated causing the rectangular spot S which is focused on the outer surface of the rim 31 to scan the rim. If a defect is encountered which is cylindrical in cross section, such as would be caused by a blister or line-over-finish defect, a portion of the light is redirected by refraction and reflection toward the mirror 65 and is focused by lenses 67, 68 into an image of the defect at the aperture 70. If the defect is only of sufficient size that it is within the field of vision of only one of the light sensitive devices 66, 79, 82, then the digital electronic apparatus associated with the inspection device will not produce a signal for rejecting the container. If, however, the defect is within the fields of vision of at least two adjacent light sensitive devices then the digital electronic apparatus will operate to give a reject signal for rejecting the container.

It can thus be seen that there has been provided an apparatus which will effectively distinguish between defects that are of the line-over-finish type which is undesirable from defects that are permissible.

Although the apparatus has been described in connection with dividing the area being scanned into three zones, it can be appreciated that more zones can be used if desired. Similarly, the apparatus has been described as being such that the article is rejected if the defect is present in two adjacent zones. If more zones are used in the inspection, then it is within the scope of the invention that the article be rejected if the defect is present in a different number of adjacent zones or in any combination of zones.

We claim:

1. The method of detecting defects in the rim of a hollow article which comprises directing a beam of radiant energy against an area of the rim, causing relative movement between the article and the beam thereby causing the beam to traverse the rim, causing the beam to create an image of the defect, dividing the area of the rim being inspected into a plurality of zones, and rejecting the article when the image of the defect lies in a predetermined number of zones of said plurality of zones of the area being inspected.

2. The method of detecting defects in the rim of a hollow article which comprises directing a beam of radiant energy against an area of the rim, causing relative movement between the article and the beam thereby causing the beam to traverse the rim of the article, causing a defect to redirect a portion of the beam out of its normal path, observing the area of the rim being inspected along the path of the redirected portion of the beam, dividing the area of the rim being inspected into a plurality of zones, and rejecting the article when the image of the defect lies in more than a predetermined number of adjacent zones of said plurality of zones of the area being inspected.

3. The method of detecting defects in the rim of a hollow article made of translucent material which comprises directing a beam of radiant energy against an area of the rim, rotating the article relative to the beam to cause the beam to scan the rim of the article, causing a defect in the rim to redirect a portion of the beam out of the normal path of the beam, focusing said redirected portion of the beam into an image, observing the area of the rim being inspected along the path of the redirected portion of the beam, dividing the area of the rim being inspected into a plurality of zones, and rejecting the article when the image of the defect lies in at least a predetermined number of adjacent zones of said plurality of zones.

4. The method of detecting defects in the rim of a hollow article made of translucent material which comprises directing a beam of radiant energy against an area of the rim, focusing the beam in a spot on the rim, rotating the article relative to the beam to cause the beam to scan the rim of the article, causing a defect in the rim to redirect a portion of the beam out of the normal path of the beam, focusing said redirected portion of the beam into an image, dividing the area of the rim being inspected into a plurality of zones, positioning a plurality of light-sensitive elements with their lines of sight in alignment with a zone of said area being inspected, causing a signal at each of said light sensitive elements when the image lies in the zone viewed by said light-sensitive element and rejecting the article when the image produces a signal in at least a predetermined number of adjacent light-sensitive elements.

5. The method of detecting defects in the rim of a hollow article made of translucent material which comprises directing a beam of radiant energy against an area of the rim, rotating the article relative to the beam to cause the beam to scan the rim of the article, causing a defect in the rim to redirect a portion of the beam out of the normal path of the beam, focusing said redirected portion of the beam into an image, dividing the area of the rim being inspected into a plurality of zones, positioning a plurality of light-sensitive elements with their lines of sight in alignment with a zone of said area being inspected, causing a signal at each of said light-sensitive elements when the image lies in the zone viewed by said light-sensitive element and rejecting the article when the image produces a signal in at least a predetermined number of adjacent light-sensitive elements in accordance with the Boolean equation $$D = (A \cdot B) V (B \cdot C) \ldots V((N-1) \cdot N)$$

where A, B, C . . . N are the zones.

6. The method of detecting defects in the rim of a hollow article made of translucent material which comprises directing a beam of radiant energy against an area of the rim, rotating the article relative to the beam to cause the beam to scan the rim of the article, causing a defect in the rim to redirect a portion of the beam out of the normal path of the beam, focusing said redirected portion of the beam into an image, dividing the area of the rim being inspected into three zones, positioning a plurality of light-sensitive elements with their lines of sight in alignment with a zone of said area being inspected, causing a signal at each of said light-sensitive elements when the image lies in the zones viewed by said light-sensitive element and rejecting the article when the image produces a signal in at least a predetermined number of adjacent light-sensitive elements in accordance with the Boolean equation $$D = (A \cdot B) V (B \cdot C)$$

where A, B and C are the zones.

7. The method of detecting line-over finish defects in the rim of a hollow article made of translucent material which comprises directing a beam of radiant energy against an area of the rim, focusing the beam in a rectangular spot on the rim, rotating the article relative to the beam to cause the beam to scan the rim of the article, causing a defect in the rim to redirect a portion of the beam out of the normal path of the beam, focusing said redirected portion of the beam into an image, dividing the area of the rim being inspected into a plurality of zones, positioning a plurality of light-sensitive elements with their lines of sight in alignment with one of said zones of said area being inspected, causing a signal at each of said light-sensitive elements when the image lies in the zone viewed by said light-sensitive element and rejecting the article when the image produces a signal in at least a predetermined number of adjacent light-sensitive elements.

8. The method of detecting line-over-finish defects in the rim of a hollow article made of translucent material which comprises directing a beam of radiant energy against an area of the rim, focusing the beam in a rectangular spot on the rim with the greater dimension thereof extending vertically, rotating the article relative to the beam to cause the beam to scan the rim of the article, causing a defect in the rim to redirect a portion of the beam out of the normal path of the beam, focusing said redirected portion of the beam into an image, dividing the area of the rim being inspected into a plurality of zones, positioning a plurality of light-sensitive elements with their lines of sight in alignment with one of said zones of said area being inspected, causing a signal at each of said light-sensitive elements when the image lies in the zone viewed by said light-sensitive element and rejecting the article when the image produces a signal in at least a predetermined number of adjacent light-sensitive elements.

9. The method of detecting line-over-finish defects in the rim of a hollow article made of translucent material which comprises directing a beam of radiant energy against an area of the rim, focusing the beam in a rectangular spot on the rim with the greater dimension thereof extending vertically, rotating the article relative to the beam to cause the beam to scan the rim of the article, causing a defect in the dim to redirect a portion of the beam out of the normal path of the beam, focusing said redirected portion of the beam into an image, dividing the area of the rim being inspected into a plurality of zones, positioning a plurality of light-sensitive elements with their lines of sight in alignment with one of said zones of said area being inspected, the line of vision of said light-sensitive elements forming an angle in a horizontal plane with the direction of the beam toward the rim of the container ranging from 125 to 175 degrees, causing a signal at each of said light-sensitive elements when the image lies in the zone viewed by said light-sensitive element and rejecting the article when the image produces a signal in at least a predetermined number of adjacent light-sensitive elements.

10. An apparatus for detecting defects in the rim of a hollow article which comprises means for supporting the article, means for directing a beam of radiant energy against the rim of the article, means for causing relative movement between the article and the beam to cause the beam to scan the rim of the article thereby causing an image of a defect in the rim of the article to be formed, and means for analyzing the image and rejecting the article when the image lies in more than a predetermined number of zones of a plurality of zones of the area being inspected.

11. An apparatus for detecting defects in the rim of a hollow article which comprises means for supporting the article, means for directing a beam of radiant energy against the rim of the article, means for causing relative movement between the article and the beam to cause the beam to scan the rim of the article thereby causing an image of a defect in the rim of the article to be formed, means for dividing the area of the rim being inspected into a plurality of zones, light-sensitive means individual to each said zone with its line of vision in alignment with each said zone whereby when a defect is present and detected by more than two or said light-sensitive means, signals are created by said light-sensitive means, and means for rejecting the article when signals are created by said light-sensitive means in two adjacent zones of the area being inspected.

12. An apparatus for detecting defects in the rim of a hollow article of translucent material which comprises means for supporting the article, means for directing a beam of radiant energy against the rim of the article, means for causing relative movement between the article and the beam to cause the beam to scan the rim of the article thereby causing a portion of said beam to be redirected by a defect, means for focusing said portion of the beam into an image of the defect, means for dividing the area of the rim being inspected into a plurality of zones, light-sensitive means individual to each said zone with its line of vision in alignment with each said zone whereby when a defect is present and detected by more than two of said light-sensitive means, signals are created by said light-sensitive means, and digital electronic means for rejecting the article when signals are created by said light-sensitive means in two adjacent zones of the area being inspected.

13. An apparatus for detecting defects in the rim of a hollow article of translucent material which comprises means for supporting the article, means for directing a beam of radiant energy against the rim of the article means for causing relative movement between the article and the beam thereby causing the beam to scan the rim of the article thereby causing a portion of the beam to be redirected by a defect, means for focusing said redirected portion of the beam into an image of the defect, means for dividing the area of the rim being inspected into a plurality of zones, light-sensitive means individual to each said zone with its line of vision in alignment with each said zone whereby when a defect is present and detected by more than two of said light-sensitive means, signals are created by said light-sensitive means, and digital electronic means for rejecting the article when signals are created by said light-sensitive means in two adjacent zones of the area being inspected in accordance with the Boolean equation $$D = (A \cdot B) V (B \cdot C) \ldots ((N-1) \cdot N)$$

where A, B, C . . . N are the zones.

14. An apparatus for detecting defects in the rim of a hollow article which comprises means for supporting the article, means for directiong a beam of radiant energy against the rim of the article, means for causing relative movement between the article and the beam to cause the beam to scan the rim of the article thereby causing a portion of the beam to be redirected by a defect, means for focusing said redirected portion of the beam into an image of the defect, means for dividing the area of the rim being inspected into a plurality of zones, light-sensitive means individual to each said zone with its line of vision in alignment with each said zone whereby when a defect is present and detected by more than two of said light-sensitive means, signals are created by said light-sensitive means, and digital electronic means for rejecting the article when signals are created by said light-sensitive means in two adjacent zones of the area being inspected in accordance with the Boolean equation $$D = (A \cdot B) \vee (B \cdot C)$$

where A, B and C are zones.

15. An apparatus for detecting defects in the rim of a hollow article which comprises means for supporting the article, means for directing a beam of radiant energy against the rim of the article, means for causing relative movement between the article and the beam to cause the beam to scan the rim of the article thereby causing a portion of the beam to be redirected by a defect, means for focusing said redirected portion of the beam into an image of the defect, means for dividing the area of the rim being inspected into a plurality of zones, light-sensitive means individual to each said zone with its line of vision in alignment with each said zone whereby when a defect is present and detected by more than two of said light-sensitive means, signals are created by said light-sensitive means, and digital electronic means for rejecting the article when signals are created by said light-sensitive means in two adjacent zones of the area being inspected, said electronic means comprising means for converting the signal from each said light-sensitive means to a binary digit and a computer for determining when the signal is provided from two adjacent light-sensitive means.

16. The combination set forth in claim 15 including means for widening said signal from said light-sensitive means.

17. An apparatus for detecting line-over-finish defects in the rim of a hollow article of translucent material which comprises means for supporting the article, means for directing a beam of radiant energy against the rim of the article, means for focusing the beam into a rectangular spot on the rim of the article, means for causing relative movement between the article and the beam to cause the beam to scan the rim of the article thereby causing a portion of the beam to be redirected by a defect, means for focusing said redirected portion of the beam into an image of a defect, means for dividing the area of the rim being inspected into a plurality of zones, light-sensitive means individual to each said zone with its line of vision in alignment with each said zone whereby when a defect is present and detected by more than two of said light-sensitive means, signals are created by said light-sensitive means, and digital electronic means for rejecting the article when signals are created by said light-sensitive means in two adjacent zones of the area being inspected, said electronic means comprising means for converting the signal from each said light-sensitive means to a binary digit and a computer for determining when the signals are provided from two adjacent light-sensitive means.

18. An apparatus for detecting line-over-finish defects in the rim of a hollow article of translucent material which comprises means for supporting the article, means for directing a beam of radiant energy against the rim of the article, means for focusing the beam into a rectangular spot on the rim of the article with the greatest dimension thereof extending vertically, means for causing relative movement between the article and the beam to cause the beam to scan the rim of the article thereby causing a portion of the beam to be redirected by a defect, means for focusing said redirected portion of the beam into an image of a defect, means for dividing the area of the rim being inspected into a plurality of zones, light-sensitive means individual to each said zone with its line of vision in alignment with each said zone whereby when a defect is present and detected by more than two of said light-sensitive means, signals are created by said light-sensitive means, and digital electronic means for rejecting the article when signals are created by said light-sensitive means in two adjacent zones of the area being inspected, said electronic means comprising means for converting the signal from each said light-sensitive means to a binary digit and a computer for determining when the signals are provided from two adjacent light-sensitive means.

19. An apparatus for detecting line-over-finish defects in the rim of a hollow article of translucent material which comprises means for supporting the article, means for directing a beam of radiant energy against the rim of the article, means for focusing the beam into a rectangular spot on the rim of the article with the greatest dimension thereof extending vertically, means for causing relative movement between the article and the beam to cause the beam to scan the rim of the article thereby causing a portion of the beam to be redirected by a defect, means for focusing said redirected portion of the beam into an image of a defect, means for dividing the area of the rim being inspected into a plurality of zones, light-sensitive means individual to each said zone with its line of vision in alignment with each said zone, the lines of vision of each said light-sensitive means forming an angle in a horizontal plane with the direction of the beam toward the rim of the article ranging between 125 and 175 degrees, whereby when a defect is present and detected by more than two of said light-sensitive means, signals are created by said light-sensitive means, and digital electronic means for rejecting the article when signals are created by said light-sensitive means in two adjacent zones of the area being inspected, said electronic means comprising means for converting the signal from each said light-sensitive means to a binary digit and a computer for determining when the signals are provided from two adjacent light-sensitive means.

20. The method of detecting line-over-finish defects in the rim of a hollow article made of translucent material which comprises directing a beam of radiant energy against an area of the rim, focusing the beam in a spot on the rim, rotating the article relative to the beam to cause the beam to scan the rim of the article, causing a defect in the rim to redirect a portion of the beam out of the normal path of the beam, focusing said redirected portion of the beam into an image, dividing the area of the rim being inspected into a plurality of zones, and rejecting the article when the image of the defect lies in at least a predetermined number of zones of said plurality of zones.

21. The method of detecting defects in the rim of a hollow article made of translucent material which comprises directing a beam of radiant energy against an area of the rim, focusing the beam in a spot on the rim, rotating the article relative to the beam to cause the beam to scan the rim of the article, causing a defect in the rim to redirect a portion of the beam out of the normal path of the beam, focusing said redirected portion of the beam into an image, dividing the area of the rim being inspected into a plurality of zones, positioning a plurality of light-sensitive elements with their lines of sight in alignment with a zone of said area being inspected, causing a signal at each of said light sensitive elements when the image lies in the zone viewed by said light-sensitive element, converting each signal into a standard digital pulse, and rejecting the article when the digital pulses occur from a predetermined number of light-sensitive elements.

22. The combination set forth in claim 17 wherein said converting means includes means for widening each said binary digit whereby the signals from adjacent light-sensitive means overlap in time.

23. The combination set forth in claim 22 wherein said converting means includes a squaring amplifier.

24. The combination set forth in claim 23 wherein said means for widening each signal comprises a one shot.

25. The combination set forth in claim 23 wherein said squaring amplifier comprises a transistorized Schmitt trigger.

26. The combination set forth in claim 17 wherein converting means is provided for each said light-sensitive means.

27. The combination set forth in claim 17 wherein said computer comprises a pair of "and" gates, each "and" gate receiving a signal from a pair of said light-sensitive means and an "or" gate electrically connected to the "and" gates.

References Cited in the file of this patent
UNITED STATES PATENTS

| | | |
|---|---|---|
| 2,902,151 | Miles et al. | Sept. 1, 1959 |
| 2,939,963 | Rideout | June 7, 1960 |